Patented June 1, 1926.

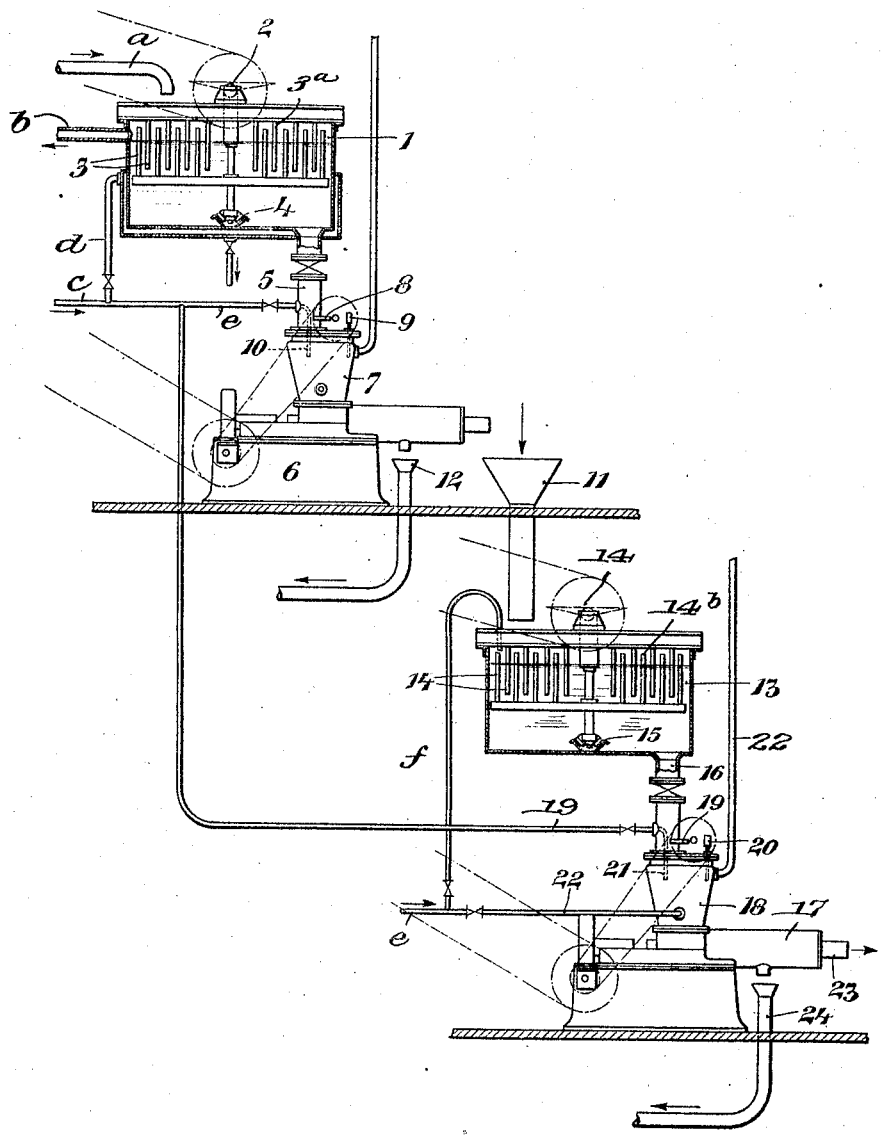

1,587,345

UNITED STATES PATENT OFFICE.

GUSTAV MOSEBACH, OF NORDHAUSEN-ON-THE-HARZ, GERMANY.

APPARATUS FOR THE RECUPERATION OF THE LYE FROM DISSOLVED CELLULAR SUBSTANCES.

Application filed July 5, 1924, Serial No. 724,454, and in Germany August 7, 1923.

This invention relates to a combined apparatus in which dissolved straw cellular substance is submitted to two individual treatments in order to mechanically recuperate the lye. In a first part of the apparatus the dissolved straw cellular substance is admixed with the undiluted lye stirred at a temperature of about 70° C. and compressed with the aid of a screw press so that about 90% of the undiluted lye are recuperated from the boiled cellular substance. The material thus heated is conveyed from the screw press into the second part of the apparatus where it is torn into tiny pieces whereupon water heated to about 70° C. is added and the mixture stirred and then strongly compressed in a screw press to separate the water and the lye.

The improved apparatus according to the invention is shown by way of example in the only figure of the accompanying drawing.

The straw cellular substance coming from the cellulose boiler through a pipe $a$ is filled, together with the undiluted lye, supplied by pipe $b$, into a vessel 1 which may be heated to 70° C. by means of a hot water pipe $e$, $d$. The vessel 1 comprises a stirring mechanism 2 for ensuring the disintegration of the material, the intimate mixture of the same and to avoid the formation of lumps. The stirring mechanism comprises preferably stationary stirring rods 3 and rotating stirring rods 3ª and the strickler 4 for the bottom. The mixture of straw cellulose and undiluted lye, after having been thoroughly stirred and heated to 70° C., is conducted by a pipe 5 into a screw press 6 with inlet funnel 7, stirrer 8 and auxiliary heating device 10 and a temperature meter 9. The auxiliary heating device 10 is connected by a pipe $e$ with the hot water pipe $c$. The screw press squeezes 90% of the undiluted lye, out of the material, and this lye flows off through a tube 12 and may be used again for dissolving fresh straw cellular substance. The straw cellular substance which comes from the screw press 6 and contains still about 10% of undiluted lye is fed through a downpipe 11 to a second vessel 13 which is fitted with a similar stirring mechanism 14 and a strickler 15 for the bottom plate as vessel 1. The stirring mechanism comprises also stationary rods 14ª and rotatable rods 14ᵇ. This second vessel 13 is also adapted to be heated by a hot water conduit $e$, $f$. The material which has been preliminarily freed from lye is in this vessel 13 submitted to heating from the hot water supplied by pipe conduit $e$, $f$ at a temperature of approximately 70° C. and separated by the stirring mechanism 14 into tiny pieces which through a pipe 16 flow to a second screw press 17 with charging hopper 18, auxiliary heating device 19, temperature meter 20 and auxiliary water admission 21 and auxiliary water supply 22. In this second screw press 17 the cellular substance is completely freed from the lye and delivered through the outflow 23 for subsequent treatment. The hot water which has been pressed out of the material and which contains still about 10% of lye flows out through a pipe conduit 24 and is preferably used for preparing fresh lye.

I claim:—

1. An apparatus for recuperating the lye from disintegrated cellulose comprising in combination a vessel for the straw cellular substance coming from the boiler and for undiluted lye, means for heating said vessel, a stirring mechanism in said vessel comprising stationary and movable stirring rods, a screw press, a pipe for leading the mixture of cellulose and lye into said screw press, a tube through which the undiluted lye squeezed out of the cellulose flows off, a second vessel, a down pipe for conducting said cellulose with the remainder of lye to said second vessel, means in said second vessel for disintegrating the cellulose material, means for heating said second vessel, a second screw press connected with said second vessel, means for adding water to the material which enters into the second screw press, an outflow pipe for the diluted lye squeezed out from the material by this second screw press, and an outflow for the material freed from lye.

2. An apparatus for recuperating the lye from disintegrated cellulose comprising in combination a vessel for the straw cellular substance coming from the boiler and for undiluted lye, means for heating said vessel, a stirring mechanism in said vessel comprising stationary and movable stirring rods, a screw press, a pipe for leading the mixture of cellulose and lye into said screw press, a tube through which the undiluted lye squeezed out of the cellulose flows off, a second vessel, a down pipe for conducting said cellulose with the remainder of lye to said second vessel, means in said second vessel for disintegrating the cellulose material, means for heating said second vessel, a second screw press connected with said second vessel, a charging hopper, a stirring mechanism an auxiliary heating device, and means for adding water to the material which enters into the second screw press, an outflow pipe for the diluted lye squeezed out from the material by this second screw press, and an outflow for the material freed from lye.

In testimony whereof I affix my signature.

GUSTAV MOSEBACH.